(12) United States Patent
Kimmel

(10) Patent No.: US 7,282,464 B2
(45) Date of Patent: Oct. 16, 2007

(54) ACTIVATED CARBON MESH FIBER MATRIX EMBEDDED WITH LITHIUM HYDROXIDE AND ZEOLITE CRYSTALS

(76) Inventor: Nancy Lydia Kimmel, 6184 N. Norborne Ct., Dearborn Hgts., MI (US) 48127

( * ) Notice: Subject to any disclaimer, the term of this patent is extended or adjusted under 35 U.S.C. 154(b) by 341 days.

(21) Appl. No.: 10/431,658

(22) Filed: Aug. 11, 2003

(65) Prior Publication Data

US 2005/0075238 A1    Apr. 7, 2005

(51) Int. Cl.
*B01J 29/89* (2006.01)
*B01J 29/06* (2006.01)
*B01J 21/18* (2006.01)
*B01J 23/00* (2006.01)

(52) U.S. Cl. .................... 502/60; 502/64; 502/180; 502/182; 502/184

(58) Field of Classification Search .................. 502/60, 502/64, 180, 182, 184
See application file for complete search history.

(56) References Cited

U.S. PATENT DOCUMENTS 4,498,976 A * 2/1985 Degnan et al. ........ 208/120.01

2002/0052291 A1 * 5/2002 Siriwardane ................ 502/244
2005/0016380 A1 * 1/2005 Matsuura et al. ............. 96/389

FOREIGN PATENT DOCUMENTS

JP      10-255860     * 10/1998
JP      2003-197487   * 7/2003

* cited by examiner

*Primary Examiner*—Elizabeth D. Wood

(57) ABSTRACT

To protect individuals/animals inside an automobile form the harmful effects of an exhaust laden atmosphere containing volatile organic carbons, occurring in a variety of situations, such as in heavy traffic, tunnels, garages, smog and in areas of poor ventilation, to prolong breathable oxygen atmosphere within automobiles to prevent asphyxiation.

Volatile organic carbons or VOC's and nitrogen oxides (NOx) are also a byproduct of vehicle exhaust and contribute to ground level ozone problems. The purpose of the invention of the activated mesh carbon laden with zeolite crystals/lithium hydroxide/lithium oxide acts to adsorb the volatile organic carbons in the surrounding atmosphere of the vehicle, and the net reactants are lithium carbonate solid and water, which is then absorbed by the Zeolite, and thereby prevent thousands of accidents and deaths, making the highways and our vehicles safer and healthier.

2 Claims, No Drawings

ACTIVATED CARBON MESH FIBER MATRIX EMBEDDED WITH LITHIUM HYDROXIDE AND ZEOLITE CRYSTALS

BACKGROUND OF THE INVENTION

Carbon monoxide is a colorless odorless poisonous gas produced by incomplete combustion of gasoline. It is a byproduct of highway vehicle exhaust which contributes to about sixty percent of all carbon monoxide emissions nationwide. In cities, automobile exhaust can cause as much as ninety five percent of all carbon monoxide emissions. These emissions can result in concentrations of carbon monoxide, particularly in local areas with heavy traffic congestion, or in tunnels. According to the EPA, over ten thousand people are treated for carbon monoxide poisoning each year. There have been hundreds of confirmed deaths due to the insidious gas. Unsafe levels can kill a person in minutes. Infants, fetuses, children, the elderly, people with respiratory problems and those who have conditions such as anemia, heart disease and immune deficiencies are especially susceptible. Many people with such ailments continue to operate vehicles.

Volatile organic carbons or VOC's and nitrogen oxides (NOx) are all byproducts of vehicle exhaust and contribute to ground level ozone problems. (VOC's) represent a group of chemical compounds that share some common characteristics. First, the organic designation indicates that the compound is almost always composed of carbon and hydrogen molecules. These molecules dissipate rapidly into the atmosphere, and create the odor that one detects when filling up a gas tank. The major man made source of VOC emissions is motor vehicles. Respiratory aliments such as asthma and bronchitis represent the primary health problems associated with human exposure to VOC's and ground level Ozone. The American Lung Association notes that anywhere from ten thousand to fifteen thousand people are admitted to emergency rooms each year suffering ozone and VOC released illnesses. Children, elderly and those with respiratory problems are especially susceptible to ozone and VOC related illnesses.

Many of us spend up to twenty hours or more per week in motor vehicles. This translates into one thousand and forty hours or more per year, not counting the intra and interstate truckers, bus driver and others who drive for a living. It is a fact, that during the hours spent on the road, in tunnels, traffic jams or in places with poor ventilation or heavy smog, people will inspire dangerous level of carbon dioxide and carbon monoxide along with various other VOC's. The symptoms of prolonged, low-level exposure to VOC's mimic the symptoms of common ailments such as headaches, nausea, dizziness, fatigue, even seasonal depression. Many of these cases are treated as viral or bacterial origin. The consequences are such that the underlying cause is not treated and permanent damage to the lungs, brain and other body systems can occur as a result. The difficulty of diagnosis also may indicate that the number of people affected could exceed the numbers quoted.

BACKGROUND OF THE INVENTION

The proposal for the experimental design will measure carbon monoxide and various VOC level that could occur in every day situation as well as life threatening situations using simulation. This proposal will demonstrate how the harmful levels of VOC's that motorists are exposed to can be eliminated within the vehicle, and thereby preserve the health of thousands of individuals, as well as prevent accidental deaths, and prolong intentional harm by elongating the amount of time that oxygen can remain in the breathable atmosphere. Perhaps this may give an individual attempting suicide extra time to rethink their intentions to harm themselves. This invention will make the highways and our vehicles safer by inducing a healthy atmosphere within the vehicles.

The mechanism of action in the invention is the following; the lithium oxide acts to adsorb the volatile organic carbons in the surrounding atmosphere of the vehicle via the ventilation ducts from the intake manifold. The naturally occurring zeolite crystals which are a combination of silicon and aluminum, act as molecular sieves for carbon monoxide and carbon dioxide yielding the byproduct water. The crystal structure is based upon repeating units consisting of a silicon atom with a plus four valance, surrounded by four oxygen atoms with a negative two valance, culminating in a tetrahedral configuration. Each oxygen atom is shared by two silicon atoms giving the tetrahedral structure a net charge of zero. When aluminum with a plus three valance is substituted in the tetrahedron a net charge of negative one occurs. This gives rise to the cation exchange properties of zeolites. Another interesting property of zeolites is that their pore size is uniform throughout the crystal, giving it a unique structure. Zeolites have both very high porosities and well defined pore sizes. It is these properties that help zeolite to act as a molecular sieve. The activated carbon acts as a sieve for the VOC's. The addition of lithium hydroxide is to assist as a alternate scrubber for the VOC's. The byproducts of its reaction are lithium carbonate solid and water. The water is then absorbed by the zeolite. The combination of these compounds embedded within a activated carbon mesh create a healthy breathable atmosphere within a vehicle, preventing VOC's from attaining dangerous concentrations.

SUMMARY OF THE INVENTION

Accordingly, the invention comprises an adsorbent composition comprising a mesh activated carbon filter impregnated with lithium hydroxide and zeolite, wherein the zeolite is hydrophilic with an adjusted diameter of 1.4399 nanometers with a silicon to aluminum atomic ratio of 35. The scientific explanation of the three materials in the adsorbent matrix is as follows; The activated carbon acts as an adsorption media for volatile organic carbons from exhaust laden atmospheres; the lithium hydroxide acts as a adsorbent media for carbon monoxide and carbon dioxide, resulting in the formation of a molecule of water being produced, which is then absorbed by the zeolite crystal. The following reaction will produce a safer breathing atmosphere in all types of vehicle. The water laden zeolite crystals will slowly evaporate the water into the vehicles atmosphere ventilation system, creating a stable humidity index.

Lithium hydroxide (LiOH) is the most common carbon dioxide sorbant.

Chemical Reaction:

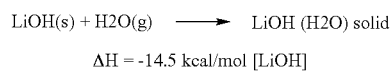

$$LiOH(s) + H_2O(g) \longrightarrow LiOH(H_2O) \text{ solid}$$

$$\Delta H = -14.5 \text{ kcal/mol [LiOH]}$$

Followed by the endothermic formation of lithium carbonate

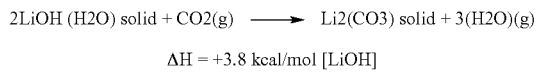

$$\Delta H = +3.8 \text{ kcal/mol [LiOH]}$$

Significantly, water is required on both sides of these reaction equations, for the net reaction . . . .

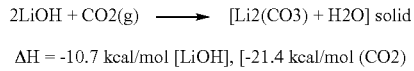

$$\Delta H = -10.7 \text{ kcal/mol [LiOH], [-21.4 kcal/mol (CO2)]}$$

Two moles of water are liberated for each mole of CO2 chemisorbed.

DETAILED DESCRIPTION OF THE INVENTION

The discovery of the adsorbent properties of activated carbon ushered in an era of renewed interest in air and water quality control. Activated carbon is the trade name for highly porous products made of carbonaceous raw materials, with a large internal surface of 400 to 1600 m^2/g with a large pore volume greater than 30 cm^3/100 g Above all, the large internal surface of more than 1000 m^2/g is significant. The total surface of 200 metric tons of activated carbon corresponds to the surface of the West Coast. Wood, peat, lignite, hard coal, oil products, charcoal, and coconut shells serve as commercial feedstock. Due to the mainly hydrophobic surface properties, activated carbon adsorbs preferably organic substances and other non-polar compounds from the gaseous and liquid phase. Activated carbon is used in a variety of filter type for the control of volatile organic carbons or VOC's. Many of these filters are used in areas where exhaust fumes are prevalent, such as airport hangers, auto repair shops, and painting operations. I the years 1900 to 1902 the Ostreijko patents were issued. These patents are the basis for the manufacture of activated carbon according to the present day definitions. Ostreijko discovered two basic principles of activated carbon production which are still valid today, namely; chemical activation, and gas activation. By chemical activation, predominantly powdered activated carbon compounds are made. Waste water treatment plants also use this type of activation to purify water. Granular products and pellets used for gas purification are primarily made by gas activation.

Utilizing the granulized activated carbon from either coconut shells or wood in conjunction with lithium hydroxide and zeolite crystals, it is possible to make a filter medium that will not only adsorb VOC's and other noxious gaseous products from incomplete combustion, but produce fresh oxygen as well. The choice of using the granules instead of pellets of activated carbon is due to the longevity of the granules to hold larger amounts of VOC's in volume. Automakers are not fond of parts that need to be replaced often, which would probably occur if the activated carbon and other scrubbing chemicals were instead, impregnated onto a media. Usually media is used to eliminate the mess associated with handling granular carbon, and to act as dual filter for other particulate matter. Usually carbon pleated fibers are impregnated with up to 1500% carbon additional carbon. They contain approximately 0.44 grams of carbon per square foot of media area Utilizing the finer granules as their own media, without attaching it to a second filter media enhances the amount of VOC's that can be adsorbed as well as increase the lifetime of the individual filter for the life of the vehicle.

Compacted carbon media will remove high amounts of gaseous contaminants during the first pass of air through the media During periods of high contamination levels, carbon media will help reduce peak loads to safer levels. A high rate of adsorption depends o the relationship between the pore structure, surface area and the shape of the contaminating molecule. The carbon filters are prepared by compressing the actual carbon granules at high temperatures in excess of 800 degrees Celsius. The lithium hydroxide granules and zeolite crystals are added to the carbon after which filter pressing is initiated for activation. A simple 2 mm thick foam margin is applied to the form of the filter. The entire filter will be secured with a plastic mesh. The amount of lithium hydroxide and zeolite to be added to a filter will be determined experimentally as evidenced by concentration of VOC's absorbed. Each filter will be made to the specification design of the ventilation system of the vehicle. For instance, for semi truck, a thicker activated carbon mesh may be necessary.

Activated Carbon Technical Data;

Base Material: Natural grain coconut shell carbon

Activation Method: High temperature steam

Adsorption Characteristics: High efficiency removal of organic compounds in liquid and or gas phase Mass to Volume Ratio: Approximately 0.5 to 6.55 g/ml or [28–34 lb/ft^3]

The structure of the carbon fibers depends on primary polymer structure. The valence state of the carbon is dependent upon its hybridization. Hybridized carbon atoms form lamellar phases. An example of this is graphite. Graphite is actually iron carbide in the form of a Fe3C compound. Graphite consist of parallel layers of condensed hexagonal carbon molecules that appear as a net like structure. Cooperation and high mobility of the p-electrons in the graphite layers induce a negative hole as it crosses the Fermi energy gap. This creates a flow of electro negativity in the directional of the p-electrons through the layers. Real graphite-like structure characterize the presence of various defects, such as violation of the layers order, incorporation of carbon atoms by way of self interstitial movement, termed "hereoatom movement". This type of atomic positioning of self atoms induce different valence states.

The carbon fibers are hexagonal in nature forming hexagonal ring shapes. These hexagonal rings form into lamellar phases without adhering to any particular axis of symmetry or displaying three dimensional properties. Carbon fibers however maintain the property of anisotropy. That is their strength lies along a specific axis. Systems of condensed carbon fiber are formed in layers that can obtain widths of sixty to one hundred angstroms with lengths up to several thousand angstroms. Activated carbon fibers have remarkable porosity. The pores of activated carbon fibers are needle shaped and are characterized by an extensive network of micro-pores. This network of micro-pores imparts a surface area up to 1500 m^2 per gram of carbon fiber.

The invention claimed is:

1. An adsorbent composition comprising a mesh activated carbon filter impregnated with lithium hydroxide and zeolite, wherein the zeolite is hydrophillic with an adjusteddiameter of 1.4399 nanometers with a Silicon to Aluminum atomic ratio of 35.

2. The absorbent composition according to claim 1, wherein the seolite is Clinoptilolite.

* * * * *